US009936074B1

(12) United States Patent
Ossan et al.

(10) Patent No.: US 9,936,074 B1
(45) Date of Patent: Apr. 3, 2018

(54) SYSTEM AND METHOD FOR UTILIZING SMS FUNCTIONALITY TO SCHEDULE FOLLOW-UP

(71) Applicant: JPMorgan Chase Bank, N.A., New York, NY (US)

(72) Inventors: Mamta Ossan, Lawrenceville, NJ (US); Ryan A. Schlosser, New York, NY (US); Richard H. Hogrogian, Cherry Hill, NJ (US); Michael Geller, Brooklyn, NY (US); Leepika Dhillon, Bear, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 15/373,574

(22) Filed: Dec. 9, 2016

Related U.S. Application Data

(63) Continuation-in-part of application No. 15/228,266, filed on Aug. 4, 2016, now Pat. No. 9,819,796.

(51) Int. Cl.
| *H04M 3/523* | (2006.01) |
| *H04M 3/51* | (2006.01) |
| *H04M 3/42* | (2006.01) |
| *H04L 29/08* | (2006.01) |
| *H04W 4/14* | (2009.01) |

(52) U.S. Cl.
CPC ........ *H04M 3/5231* (2013.01); *H04L 67/146* (2013.01); *H04M 3/42059* (2013.01); *H04M 3/5183* (2013.01); *H04M 3/5235* (2013.01); *H04W 4/14* (2013.01); *H04M 2242/28* (2013.01)

(58) Field of Classification Search
CPC ........... H04M 3/5231; H04M 3/42059; H04M 3/5183; H04M 3/5235; H04M 2242/28; H04L 67/146; H04W 4/14
See application file for complete search history.

(56) References Cited

U.S. PATENT DOCUMENTS

| 9,232,373 | B1 * | 1/2016 | Caldwell | ................. H04W 4/14 |
| 9,532,197 | B1 * | 12/2016 | Lew | ........................ H04W 4/14 |
| 2003/0185379 | A1 * | 10/2003 | O'Connor | ............... H04L 51/14 |
| | | | | 379/265.02 |
| 2006/0167729 | A1 * | 7/2006 | Rafter | .................... G06Q 10/00 |
| | | | | 705/7.16 |
| 2008/0140498 | A1 * | 6/2008 | Setty | .................. G06Q 10/1093 |
| | | | | 705/7.18 |

(Continued)

*Primary Examiner* — Nathan Mitchell
(74) *Attorney, Agent, or Firm* — LeClairRyan, a Professional Corporation

(57) ABSTRACT

A method and system facilitate scheduling of a response to a text directed to a landline by maintaining a registration of a handler system with a text hub, wherein the text hub intercepts text messages forwarded through a mobile carrier to multiple dedicated landlines. A message router of the registered handler system identifies the destination landline and routes the text message to a call center server system based on the identified destination landline. The method additionally includes processing the text message at the call center server utilizing a text processor. The text processor identifies a text sender, schedules a follow-up communication at a follow-up time, and queues the text message and scheduled follow-up.

20 Claims, 5 Drawing Sheets

(56) References Cited

U.S. PATENT DOCUMENTS

| | | | |
|---|---|---|---|
| 2008/0192923 A1* | 8/2008 | Ruckart | H04M 3/5231 379/265.09 |
| 2009/0186634 A1* | 7/2009 | Sureka | H04W 4/14 455/466 |
| 2010/0004007 A1* | 1/2010 | Vogel | H04L 51/38 455/466 |
| 2010/0124905 A1* | 5/2010 | Pratt | H04L 51/14 455/412.1 |
| 2013/0129075 A1* | 5/2013 | Whitaker | H04M 3/523 379/265.09 |
| 2013/0196697 A1* | 8/2013 | Lew | H04W 4/14 455/466 |
| 2014/0052645 A1* | 2/2014 | Hawes | G06Q 10/20 705/304 |
| 2014/0126713 A1* | 5/2014 | Ristock | H04M 3/5231 379/265.09 |
| 2014/0198905 A1* | 7/2014 | Clark | H04M 3/5231 379/209.01 |
| 2014/0343927 A1* | 11/2014 | Sandei | G06F 17/2785 704/9 |
| 2015/0049869 A1* | 2/2015 | Petrovykh | H04M 3/5158 379/265.09 |
| 2015/0074170 A1* | 3/2015 | Steiner | G06Q 10/06 709/202 |
| 2015/0262188 A1* | 9/2015 | Franco | G06Q 30/016 705/7.21 |
| 2016/0330144 A1* | 11/2016 | Dymetman | H04L 51/02 |

* cited by examiner

SYSTEM AND METHOD FOR UTILIZING SMS FUNCTIONALITY TO SCHEDULE FOLLOW-UP

RELATED APPLICATIONS

This application is a continuation-in-part application of U.S. patent application Ser. No. 15/228,266, filed on Aug. 4, 2016, the entirety of which is hereby incorporated by reference.

FIELD OF THE INVENTION

Embodiments of the present invention are generally related to systems and methods for integrating short message service (SMS) texting as a vehicle for facilitating follow-up communications and in particular to handling text messages directed to an originating landline.

BACKGROUND OF THE INVENTION

Traditionally, in order to initiate contact with customers, businesses utilize call centers to initiate contact from a landline of a business to a customer telephone. It is increasingly common for telephone numbers provided by customers to be mobile phone numbers and for customers to be utilizing smart phones having capabilities beyond reception of voice calling. For example, while the customers have the technology to receive voice calls, they also have the capability to send and receive SMS texts and emails and engage in online chat sessions using internet connectivity on the same mobile device.

While the availability of a mobile phone number would seem to increase chances that a customer can be reached, customers are often otherwise engaged and unable to handle a voice call. Typically, when unable to answer a voice call, customers simply do not answer the call or turn off their ringers. No currently available system or method exists for customers to indicate that they are willing to accept a call from the landline, but are temporarily unable to do so, for example by requesting a call-back or scheduling other follow-up communications.

With respect to certain types of calls, for example, collections calls, the connection success rate is extremely low. The outbound success rate, known as "right party contact rate" or RPC rate is often less than two percent. When businesses make a high volume of calls, even a modest improvement to the RPC rate results in a large additional number of motivated customers per month.

With the continued rise of smartphone technology, SMS texting has emerged as a communication medium of choice for modern consumers. Texting encourages concise communication with its small message-size limit. Because texting is asynchronous, the process of exchanging texts does not involve wasted time. Customers are able to focus on other tasks while awaiting a response. Out of customer frustration with other available inadequate modes of communications, customers frequently prefer responding to calls with an SMS text. Because the business calls are generally tied to landlines, business personnel do not receive these texts. The pervasiveness and familiarity of text messaging makes it an ideal channel to communicate with and retain customers.

Accordingly, a solution is needed that will allow mobile users to employ SMS texting to allow customers to respond to voice calls with a text that will reach an existing land line. Further, a solution is needed that will transport SMS texts sent to business landlines to a message router that will allow scheduling of follow up communications by customers who are temporarily unable to accept incoming calls.

SUMMARY OF THE INVENTION

Embodiments of the invention are directed to a method for scheduling follow-up communications responsive to text messages forwarded from a mobile device to a dedicated landline. The method includes maintaining a registration of a handler system with a text hub, wherein the text hub intercepts text messages forwarded through a mobile carrier to multiple dedicated landlines. The method additionally includes receiving at a message router of the registered handler system, a text message directed to one of the dedicated landlines and identifying the destination landline. Upon identification, the method routes the text message to a call center server system based on the identified destination landline and processes the text message at the call center server utilizing a text processor. The text processor performs steps of identifying a text sender, scheduling a follow-up communication at a follow-up time, and queuing the text message and scheduled follow-up to ensure that the scheduled follow-up is conducted at the scheduled follow-up time. Embodiments of the invention further include a computer readable medium storing instructions, that when executed by a processor, perform the steps described above.

In an additional embodiment, a system is provided for scheduling follow-up communications responsive to text messages forwarded from a mobile device to a dedicated landline. The system includes a handler system registered with a text hub, wherein the text hub intercepts text messages forwarded through a mobile carrier to the dedicated landline, and the registered handler system receives the text message from the text hub. The system additionally includes a message router operatively connected with the registered handler system, the message router receiving a text message directed to one of the dedicated landlines, identifying the destination landline, and routing the text message to a call center server system based on the identified destination landline. The system additionally includes a text processor for processing the text message at the call center server system by performing multiple steps including identifying a text sender, scheduling a follow-up communication at a follow-up time, and queuing the text message and scheduled follow-up to ensure that the scheduled follow-up is conducted at the scheduled follow-up time.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the presently disclosed invention provide a method and system for scheduling follow-up communications to a voice call from a landline by integrating SMS texting directed to the landline into a call center server platform.

Figure 1:
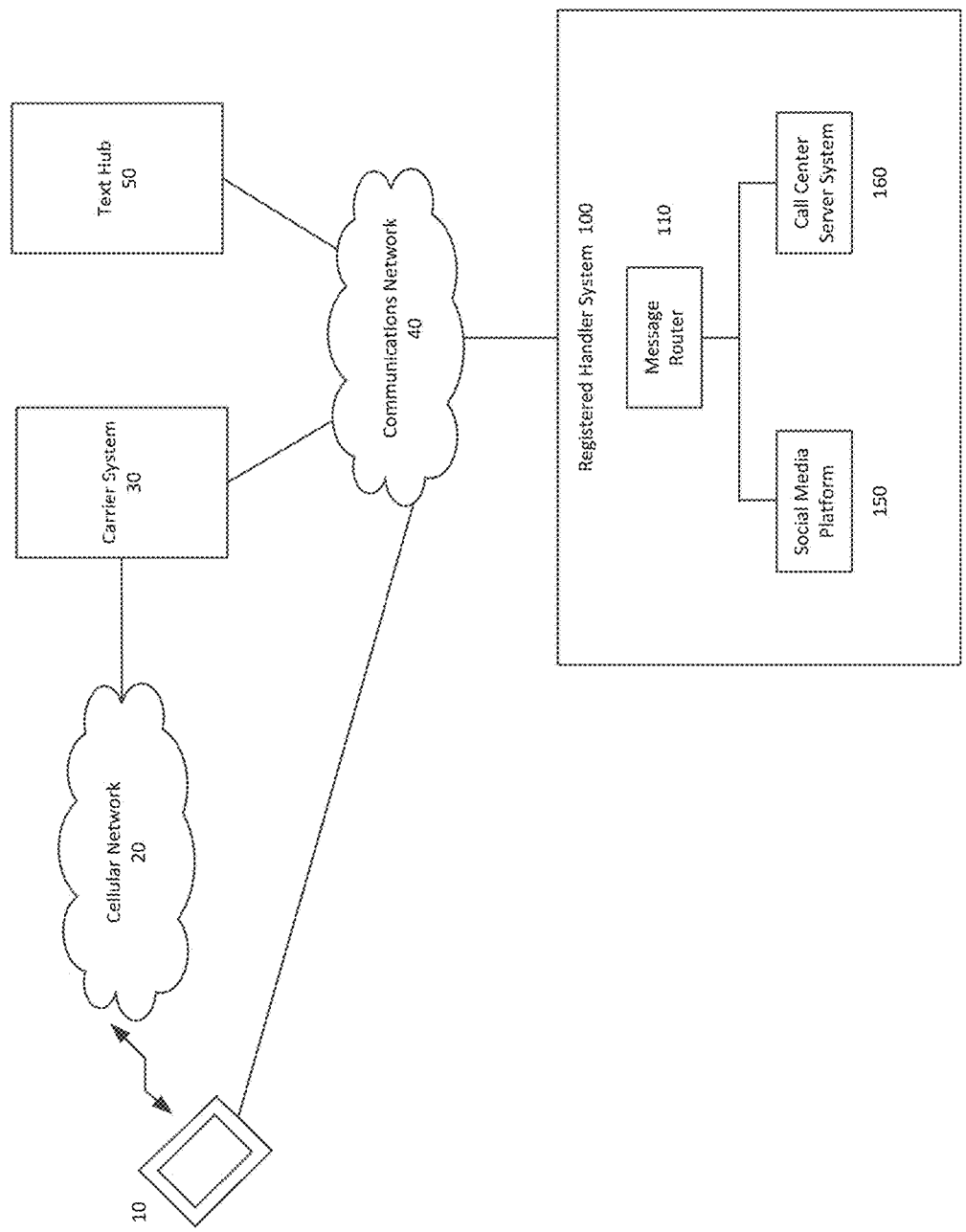
FIG. 1 is a block diagram illustrating an operating environment for a follow-up scheduling system in accordance with an embodiment of the invention.

FIG. 1 is a block diagram illustrating an operating environment for a follow-up communication scheduling system utilizing SMS text messaging in accordance with an embodiment of the invention. A mobile device 10 may communicate over a cellular network 20 with a carrier system 30. The carrier system 30 may be connected over one or more communications networks with additional systems such as a text hub 50. One or more registered handler systems 100 for perpetuating text message communications may also be connected over the communications network 40. The registered handler systems 100 may include a message router for appropriately routing the SMS text, for example to a call center server system 160 or to a social media platform 150. Additional systems or devices may also be present in the displayed environment.

Generally, when a text is directed to a landline by a mobile phone, the mobile carrier handling the request determines that the number is a landline and is thus unable to receive a text message and routes the request to the text hub 50. The text hub 50 looks for a registered handler associated with the toll free landline number and dispatches the text to the registered handler. If no registered handler is located, the text will not be delivered. In the illustrated system, the registered handler 100 is found and the message router 110 receives and directs the message within the registered handler system 100.

The mobile device 10 may include handheld devices including mobile smartphones, such as Android® phones and iPhones®, tablets, or hand-held wireless devices such as PDAs, multiprocessor systems, microprocessor-based or programmable consumer electronics, minicomputers, other handheld devices that may now be available or may in the future become available. Mobile devices 10 may have a native functionality including a call decline feature. The call decline feature allows the recipient of a voice call on a mobile device to activate a decline button appearing on the mobile device screen in response to a voice call. The call decline feature may be configured to allow the mobile user to select from a series of text messages to send a return text requesting a call-back or a follow-up appointment.

With the popularization of smartphones, tablets and other mobile devices, mobile applications, or "apps," have become household terms. Many businesses now provide mobile apps to their customers. Thus, the mobile devices 10 may utilize a downloadable app supplied by the registered handler system 100. The mobile device 10 may include a processor and a memory. The memory may include, for example, applications and a browser. The processor may also be connected to additional components, either stored in a memory or installed as separate hardware components, such as for example battery or power source, clock, camera, input interface, network interface, output devices, geo-locator, and operating system.

In embodiments of the invention, businesses making customer voice calls may provide their own apps to be downloaded on the customer mobile device. These apps may interact with the native mobile device app to expand the scope of options for return text communications. These apps may provide additional functionality such as the sharing of user calendar and customer location information with the business to facilitate follow-up scheduling. The customer calendar may indicate availability of the customer for follow-up. Access to the customer location may enable determination of whether the customer is out of the country out of phone range, or likely unavailable. In embodiments of the invention, the mobile app provided by the business may further be configured to prompt the mobile user for preferred times and communication methods for follow-up communications. In further embodiments of the invention, the mobile app may be utilized to send a push notification rather than a voice call to the customer and may further send a calendar invitation for follow up. In yet further embodiments, once the follow-up has been scheduled, the business system may provide, for instance via a push notification, a direct line for the customer to initiate the follow-up communication. A business server may prompt the customer via the mobile app or via push notifications for preferred contact times. Alternatively, the customer may access a website of the business using a mobile device browser and enter preferred contact times. Using the same mechanisms, the customer may agree to provide access to personal or mobile calendars and mobile phone locations.

The cellular network 20 may include cellular towers operating in conjunction with a provider such as Verizon, AT&T or Sprint or other provider. A cellular network or mobile network is a communication network where the last link is wireless. The network is distributed over land areas called cells, each served by at least one fixed-location transceiver, known as a cell site or base station.

The carrier system 30 may include multiple servers including at least one processor and multiple applications executed by the processor capable of performing desired functions to interact with connected components.

The text hub 50 is a messaging service that enables companies, mobile networks operators, Internet service providers, and fixed-line operators to efficiently deliver mobile messages. Once the carrier system 30 determines that a target number is not a mobile number, it will forward the number to the text hub 50 and delegate the handling of the text to the text hub 50. Text hubs are provided for example by companies such as Syniverse™ and SAP™. In operation, the text hub 50 will look up a handler for the landline number. In some instances the text hub 50 may not find a handler and will be unable to deliver the text message, but may ensure that feedback is provided to the sender. However, the registered handler 100 registers with the text hub 50 to ensure that the look up procedures will succeed. The text hub 50 will dispatch the received SMS text message to the registered handler system 100.

The communications network 40 may be the Internet, but may be or include other types of networks. For example, the network 40 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. Although only one communications network is shown, multiple communications networks may be utilized for communicating between the displayed components.

The registered handler system 100 may operate through a host server that administers multiple computing systems and applications for internal and external users. The host server can host web sites, files, images, games and similar content. The host server can be shared among many clients. The registered handler system 100 that perpetuates SMS text communications may include multiple servers including at least one processor and multiple applications executed by the processor capable of performing desired functions to interact with connected components The system 100 interacts with the interconnected systems to control a facilitate texting. In the illustrated embodiment, the registered handler system 100 includes the message router 110 for routing the SMS text messages to a social media platform 150 or call center server system 160 for handling the text communications. While the system 100 is labeled as the registered handler system, a single component within the system may be registered as the handler.

The message router 110 receives the text messages intended for dedicated landlines and routes the text message to a component of the registered handler system 100 based on the destination landline. For example, if the text is directed to a customer service landline as set forth in U.S. patent application Ser. No. 15/228,266 the message router 110 may route the text to a social media platform 150. The social media platform 150 is described in its totality in the above-mentioned co-pending patent application, which is incorporated by reference in its entirety.

If the destination landline is not a customer service landline, but is, for example, rather a collections landline, the message router may route the message to a call center server system 160. The call center server system 160 may include a plurality of call center servers including Voice Response Units (VRU) or interactive voice response (IVR) units that facilitate the interaction between a human (typically a caller) and a computer that is programmed to respond to the human's requests. These systems involve a computer phone application that accepts touch-phone keypad selection input from the caller and provides appropriate information in the form of voice answers or a connection to a "live" operator or agent. In embodiments of the invention, the automated system can be a question tree, which is the text equivalent of an IVR system or an automated robot using artificial intelligence to provide human-like responses. The call center server system 160 may include automated systems or may be attended by customer service agents.

Various business units, in addition to customer service and collections, may also make calls and receive return texts. For example, the fraud detection department or loan servicing departments may make voice calls and receive text messages in return. The message router 110 identifies the destination landline and routes the text message accordingly.

The registered handler system 100 may further include or communicate with additional systems, such as account processing systems storing customer account data and authentication systems facilitating authentication of customers. The authentication systems may incorporate various types of authentications based on user activities. Authentication requirements may include, for example, biometric requirements, challenge questions, usernames and passwords, and other known authentication mechanisms.

Figure 2:
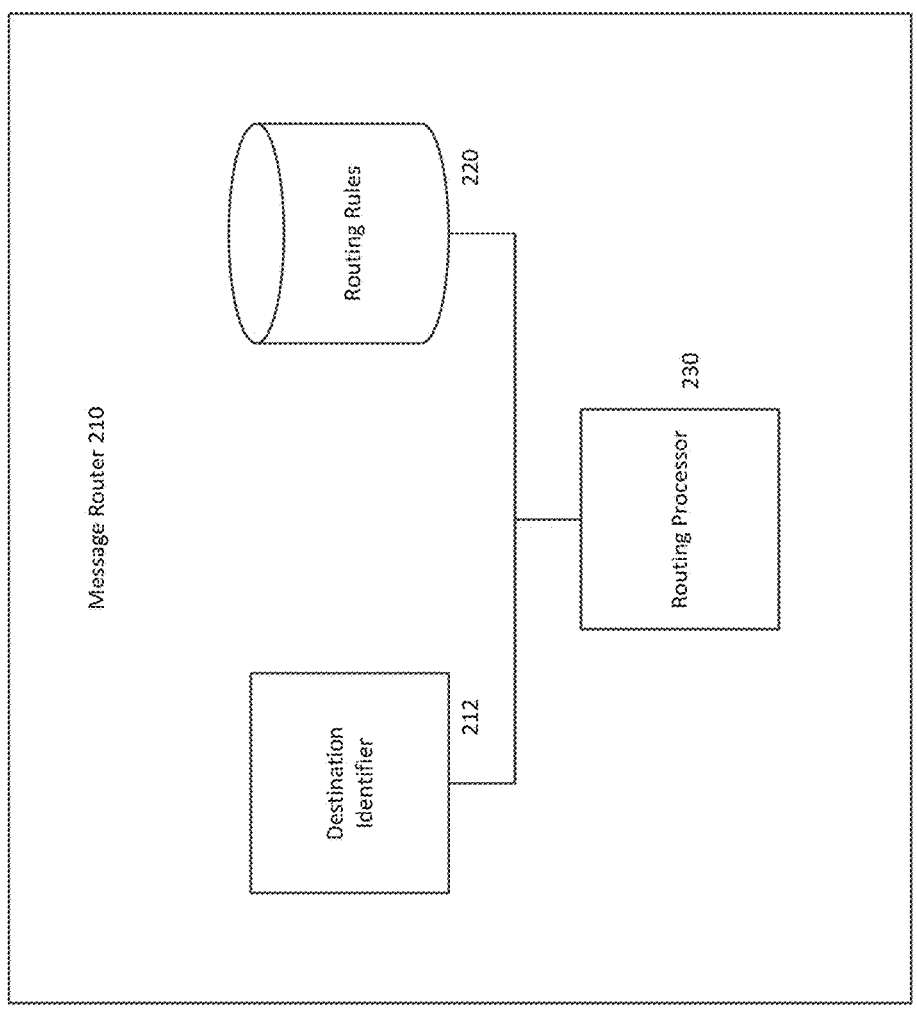
FIG. 2 is a block diagram illustrating a message router in accordance with an embodiment of the invention.

FIG. 2 is a block diagram illustrating the message router 210. The message router 210 may include one or more software modules stored in a memory structure executed by one or more processors. The message router 210 may include a destination identifier 212, routing rules 220, and a routing processor 230. In operation, the destination identifier identifies the destination of the received text, by identifying the targeted landline number. A database stores routing rules 220. For example, the database may include a table associating potential destination landlines with call servers or social media platforms. Thus the routing rules 220 provide the information necessary to properly direct received text messages. The routing processor 230 performs routing based on information received from the destination identifier 212 and instructions contained within the routing rules 220. Thus, the message router 210 allows for tracking asynchronous messages from customers and directing the messages to an appropriate destination for scheduling follow-up.

Figure 3:
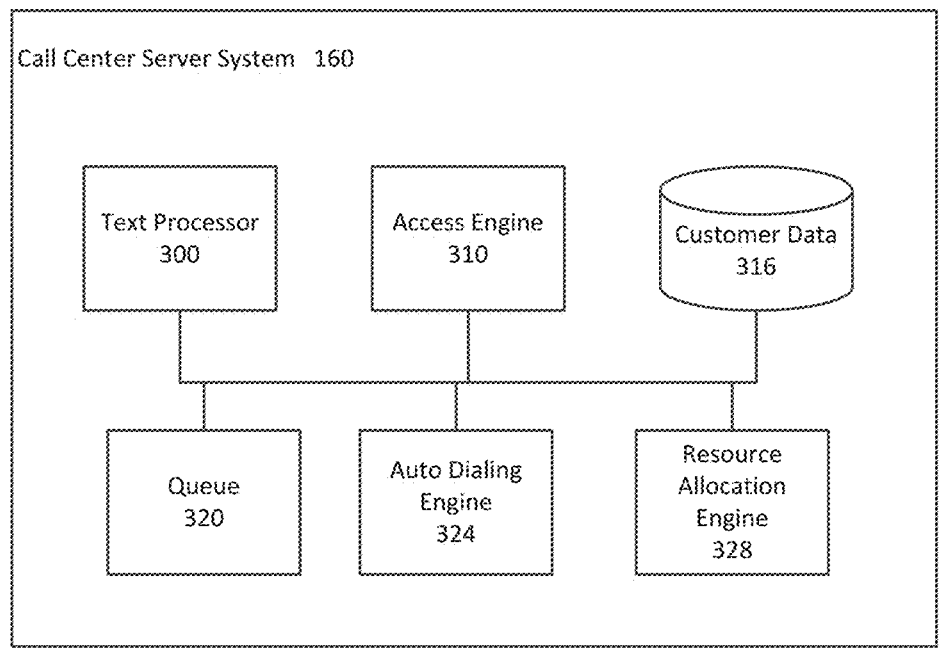
FIG. 3 is a block diagram illustrating a call center server system in accordance with an embodiment of the present invention.

FIG. 3 is a block diagram illustrating a call center server system 160 in accordance with an embodiment of the invention. The call center server system 160 may include multiple call center servers in addition to the functionality displayed in FIG. 3. The call center server system 160 may include multiple components such as a text processor 300, an access engine 310, a database storing customer data 316, queue 320, an auto-dialing engine 324, and a resource allocation engine 328. These components operate cooperatively to handle received text messages by scheduling and conducting follow-up communications with customers responsive to the text messages received from the customers.

The text processor 300 receives the text messages and ascertains their content. For example, the text processor 300 may parse the text message to detect a call-back data and time. Alternatively, the text message may include a calendar link for the customer and the text processor 300 may instruct the access engine 310 to access the calendar link. As a further alternative, the text processor 300 may determine that the text message includes no particular time and may utilize the access engine 310 to access the stored customer data 316 in order to determine an appropriate call back time or other appropriate call-back method.

The text processor 300, upon determining an appropriate follow-up time and format, may schedule the follow up time and may store the follow-up in a queue 320 such that the auto-dialing engine 324 can access the queue 320 and execute the follow-up communication.

The access engine 310 may be utilized to access stored customer data 316 or customer data in other locations. For example, a received text may provide a location for retrieval of customer information including available call-back times. The available call-back times may be stored, for example, in an external calendar accessible over a network utilizing the access engine 310.

The customer data 316 may include any and all types of customer data typically stored by the business. For example, if the business is a financial institution, the data may include account data as well as personal and contact data. The customer data 316 may further include location data and calendar data. The customer data 316 may include a complete customer profile for participating customers including phone numbers, addresses, email addresses, calendar links, accounts, etc.

The queue 320 may store follow-up information as determined by the text processor 300. As set forth above, upon determining an appropriate follow-up time and methodology, the text processor 300 stores the information in the queue 320. The auto-dialing engine 324 may access the queue 320 to ensure that all scheduled follow-up communications are properly executed. The queue 320 may comprise or interact to create a trickle feed or live table.

The resource allocation engine 328 may periodically process information in the queue in order to manage resources. For example, the resource allocation engine 328 may determine that over two thousand follow-up communications have been scheduled at noon on a particular day and that fewer than one thousand follow up communications have been scheduled at one PM. Accordingly, the resource allocation engine 328 may redistribute resources including call center agents, IVRs, and VRUs to ensure availability for the scheduled call back times. The resource allocation engine 328 may further generate reminders to customers of scheduled follow-up communications immediately prior to the scheduled follow-up. The resource allocation engine 328 may further interact with the text processor 300 to schedule the follow-up communications. For example, the text processor 300 may determine, through the use of access engine 310, that the customer has multiple available call-back times based on the customer calendar. The text processor 300 may interact with the resource allocation engine 328 to select a call-back time from the available call back times for a particular customer based on the available staff and resources and the number of follow-up communications in the queue 320 that are already scheduled for other customers during the available times. The resource allocation engine 328 may further conduct headcount management by automatically assigning agent work schedules based on the contents of the queue 320. The resource allocation engine 328 may further detect every SMS message received and thus every entry located in the queue with the call-back time and send the entries to impacted call center servers.

Figure 4:
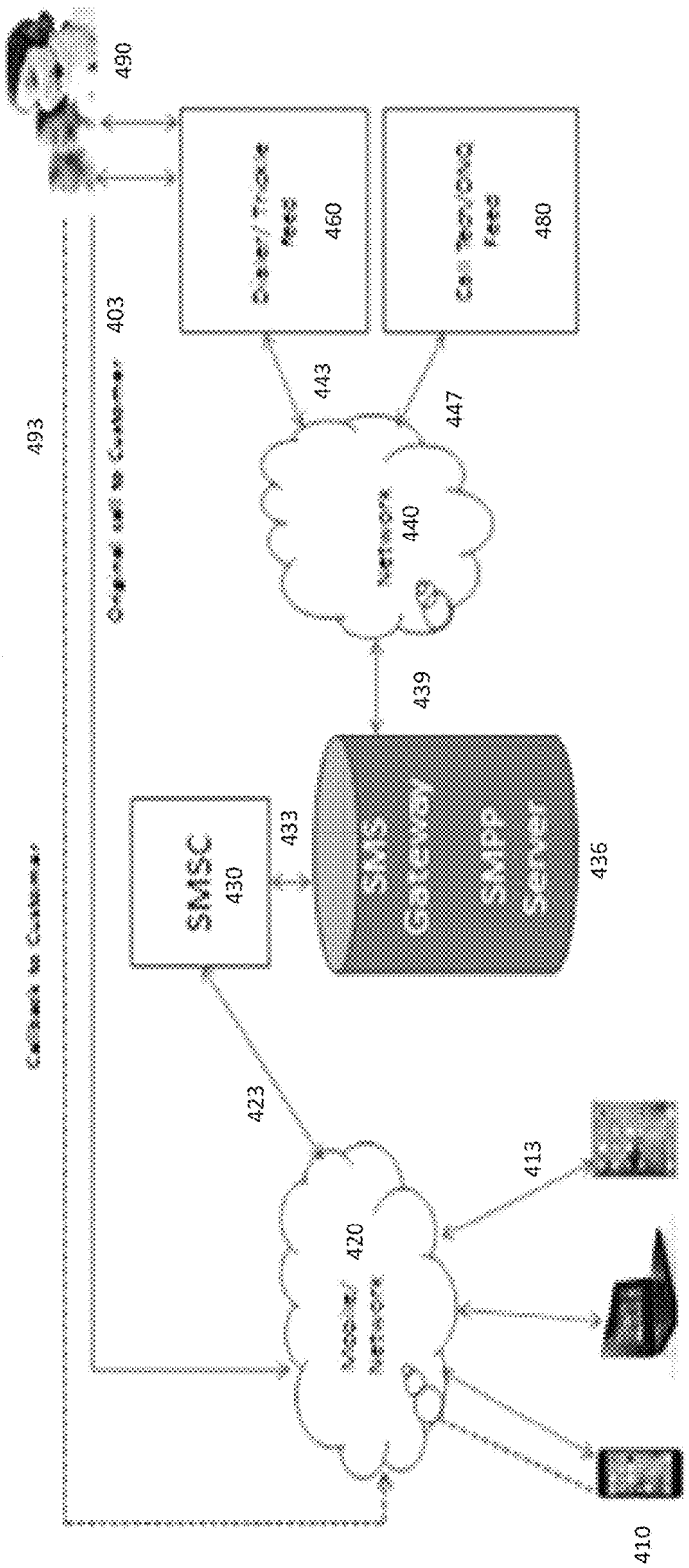
FIG. 4 is a work flow diagram illustrating interactions between various components of the follow-up scheduling system in accordance with an embodiment of the invention.

FIG. 4 is a workflow diagram illustrating a process for facilitating follow-up communication in accordance with one embodiment of the invention. At 403, a call server makes an original call to customers 410 from a landline. At 413, the customers send a return text to the landline. Optimally, the customers utilize a decline feature on their mobile devices that provides a selectable menu of return text messages or a link providing access to customer information for the text recipient. This functionality may be enhanced by an app provided by a business that interacts with the mobile device native functionality to provide selectable scheduling options for customer selection. The customers transmit the text at 413 over a mobile network 420. The return text message is routed through a short message service center (SMSC) 430 and subsequently to SMS Gateway and SM peer to peer (SMPP) server 436. The server 436 transmits the text message at 439 over the network 430. Depending upon the determination of the message router, the call may be routed at 443 to Dialer/Trickle feed 460 or at 447 to call tech/ONQ feed 480. Once routed, the follow-up is scheduled as described above and a call-back is executed at 493. The call-back may be facilitated by a live agent 490.

Although FIG. 4 displays a follow up calling process, follow-up and initial outreach may also be conducted by other methods. For example, the registered handler system 100 may send a URL via text message through the text hub allowing the customer to download a mobile app or alternatively, send a URL that will activate a mobile app that the customer has already downloaded. The downloadable applications preferably include a downloadable mobile app for use by the customer. The mobile app is downloadable over the Internet via a network interface to the mobile devices as described above. Once downloaded, the downloadable mobile application may operate on the user mobile devices to interact with the registered handler system. Thus, the registered handler system 100 may generate a unique URL containing an activation link and may send an alert to the mobile device including the URL, wherein selection of the URL will open the mobile app on the mobile device and allow the mobile user to connect. This alert can be received by the mobile device when the user is offline and bring the user online through selection of the uniquely generated URL.

Figure 5:
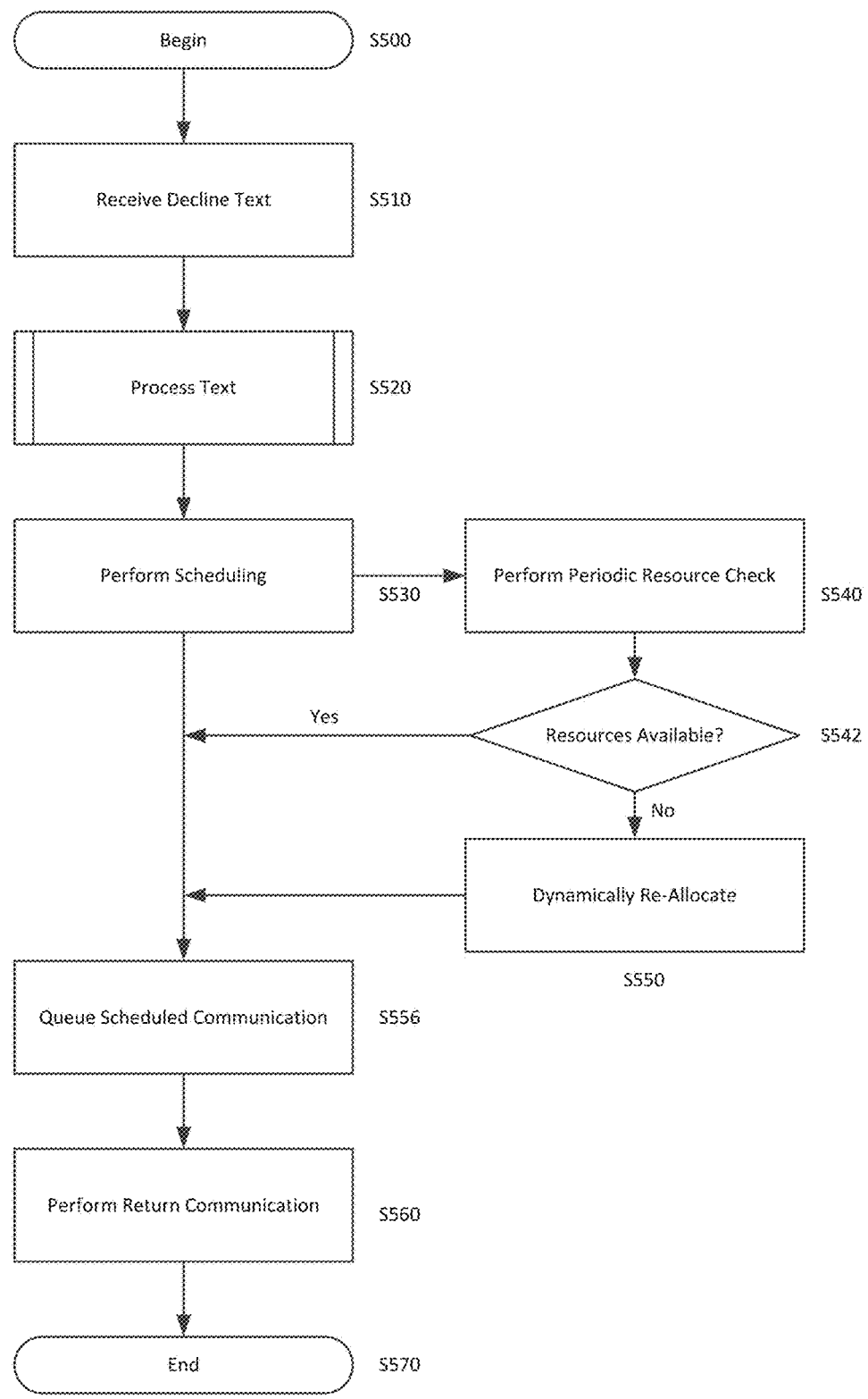
FIG. 5 is a flow chart illustrating a method for scheduling follow-up communications in accordance with an embodiment of the present invention.

FIG. 5 is flow chart illustrating a method of scheduling and executing follow-up communications in accordance with an embodiment of the invention. The method begins in S500 after a business system makes a voice call to a customer from a landline and the system (via the registered handler described above) receives an SMS text in return from the customer. In S520, the system processes the text. As set forth above, the message router determines an appropriate destination for the text. In the embodiment of FIG. 5, the message router sends the received text to the call center system and the call center system schedules a follow-up communication in S530 as set forth above. In S556, the system queues the scheduled communication. The system performs the scheduled return communication in S560 and the process ends in S570.

Periodically, the system performs resource checks in S540 utilizing the resource management engine. If resources are available in S542, the system may queue the scheduled follow-up communication in S556. However, if resources are not available in S542, the system may dynamically re-allocate resources in S550. This dynamic reallocation may also occur periodically through investigation of the contents of the queue. Although the steps above are shown in a particular order, they may be performed in other workable sequences and additional steps may be included.

All of the components shown in the FIGs. above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Although many other internal components of the computer are not shown, those of ordinary skill in the art will appreciate that such components and the interconnections are well known. Accordingly, additional details concerning the internal construction of the computer need not be disclosed in connection with the present invention.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A method for scheduling follow-up communications responsive to text messages forwarded from a mobile device to a dedicated landline, the method comprising:
    maintaining a handler system associated with a text hub, wherein the text hub intercepts text messages forwarded through a mobile carrier to multiple dedicated landlines, the handler system associated with the multiple dedicated landlines;
    receiving from the text hub at a message router of the handler system, a text message directed to one of the dedicated landlines;
    identifying the destination landline using the message router of the handler system;
    routing the text message using the message router of the handler system to one of multiple processing platforms of the handler system, the processing platform selected based on the identified destination landline, the multiple processing platforms including a call center server system; and
    processing the text message at the call center server system utilizing a text processor, the text processor performing steps including;
    identifying a text sender;
    scheduling a follow-up communication at a follow-up time; and
    queuing the text message and scheduled follow-up in a queue to ensure that the scheduled follow-up is conducted at the scheduled follow-up time.

2. The method of claim 1, wherein the text message is generated using a native mobile application.

3. The method of claim 2, further comprising utilizing a business mobile application in combination with the native mobile application to provide selectable times for follow-up communications.

4. The method of claim 2, further comprising receiving a return text with a URL linking to a customer calendar to facilitate scheduling of the follow-up communication.

5. The method of claim 1, further comprising utilizing a resource management engine to review the queue and dynamically reallocate follow-up resources based on the queue.

6. The method of claim 1, further comprising utilizing a resource management engine to schedule the follow-up communication by selecting a follow-up time based on available resources.

7. The method of claim 1, further comprising scheduling the follow-up communication based on a time proposed in the text message.

8. The method of claim 1, further comprising scheduling the follow-up communication based on access to a customer calendar authorized by the text message.

9. The method of claim 1, wherein the follow-up communication is telephone call from a landline occurring at the scheduled time.

10. The method of claim 1, further comprising providing the customer with a direct dial line to make the follow up communication.

11. A system for scheduling follow-up communications responsive to text messages forwarded from a mobile device to a dedicated landline, the system comprising:
    a handler system associated with a text hub and with multiple dedicated landlines, wherein the text hub intercepts text messages forwarded through a mobile carrier to the multiple dedicated landlines, and the handler system receives the text message from the text hub;

a message router integrated with the handler system, the message router receiving a text message directed to one of the dedicated landlines and identifying the destination landline, the message router routing the text message to one of multiple processing platforms of the handler system, the processing platform selected based on the identified destination landline, wherein one of the multiple processing platforms is a call center server system; and a text processor for processing the text message at the call center server system by performing steps including;
identifying a text sender;
scheduling a follow-up communication at a follow-up time; and
queuing the text message and scheduled follow-up in a queue to ensure that the scheduled follow-up is conducted at the scheduled follow-up time.

12. The system of claim 11, further comprising utilizing a business application in combination with the native mobile application to provide selectable times for follow-up communications.

13. The system of claim 12, further comprising receiving a return text with a URL linking to a customer calendar to facilitate scheduling of the follow-up communication.

14. The system of claim 11, further comprising a resource management engine for reviewing the queue and dynamically reallocate follow-up resources based on the queue.

15. The system of claim 11, further comprising a resource management engine for scheduling the follow-up communication by selecting a follow-up time based on available resources.

16. The system of claim 11, further comprising scheduling the follow-up communication based on a time proposed in the text message.

17. The system of claim 11, further comprising scheduling the follow-up communication based on access to a customer calendar authorized by the text message.

18. The system of claim 11, wherein the follow-up communication is telephone call from a landline occurring at the scheduled time.

19. The system of claim 11, further comprising providing the customer with a direct dial line to make the follow up communication.

20. A non-transitory computer readable medium storing code, wherein the code is executed by a processor to perform steps including:

maintaining a handler system associated with a text hub, wherein the text hub intercepts text messages forwarded through a mobile carrier to multiple dedicated landlines, the handler system associated with the multiple dedicated landlines;

receiving from the text hub at a message router of the handler system, a text message directed to one of the dedicated landlines;

identifying the destination landline using the message router of the handler system;

routing the text message using the message router of the handler system to one of multiple processing platforms of the handler system, the processing platform selected based on the identified destination landline, the multiple processing platforms including a call center server system; and processing the text message at the call center server system utilizing a text processor, the text processor performing steps including;
identifying a text sender;
scheduling a follow-up communication at a follow-up time; and
queuing the text message and scheduled follow-up in a queue to ensure that the scheduled follow-up is conducted at the scheduled follow-up time.

* * * * *